US012320452B2

(12) United States Patent
Chung

(10) Patent No.: US 12,320,452 B2
(45) Date of Patent: *Jun. 3, 2025

(54) MAGNETIC JOINT

(71) Applicant: Kohler Co., Kohler, WI (US)

(72) Inventor: Chanseol Chung, Milwaukee, WI (US)

(73) Assignee: Kohler Co., Kohler, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/421,682

(22) Filed: Jan. 24, 2024

(65) Prior Publication Data

US 2024/0280199 A1  Aug. 22, 2024

Related U.S. Application Data

(63) Continuation of application No. 17/473,271, filed on Sep. 13, 2021, now Pat. No. 11,913,574, which is a
(Continued)

(51) Int. Cl.
F16L 27/08 (2006.01)
E03C 1/04 (2006.01)
(Continued)

(52) U.S. Cl.
CPC ............ F16L 27/08 (2013.01); E03C 1/0404 (2013.01); F16B 1/00 (2013.01); F16L 27/0849 (2013.01);
(Continued)

(58) Field of Classification Search
CPC . F16L 27/08; F16L 37/004; F16B 1/00; F16B 2200/83; E03C 2001/0414
See application file for complete search history.

(56) References Cited

U.S. PATENT DOCUMENTS 1,138,187 A   5/1915 Bridges
1,255,577 A   2/1918 Berry
(Continued)

FOREIGN PATENT DOCUMENTS

CN    2777304    5/2003
CN   102007330    4/2011
(Continued)

OTHER PUBLICATIONS

Second Office Action CN Application No. 201910152115.5 dated Jan. 1, 2021 (4 pages).
(Continued)

Primary Examiner — David Bochna
(74) Attorney, Agent, or Firm — Husch Blackwell LLP

(57) ABSTRACT

A magnetic joint includes a first member and a second member. The first member includes a first plurality of magnets spaced annularly apart from each other. The second member includes a second plurality of magnets spaced annularly apart from each other. The first member is rotatably coupled to the second member. The first member is configured to be coupled to a first component and the second member is configured to be coupled to a second component. The first plurality of magnets and the second plurality of magnets are configured to cooperatively define a plurality of rotational positions between the first component and the second component.

18 Claims, 13 Drawing Sheets

Related U.S. Application Data continuation of application No. 16/284,707, filed on Feb. 25, 2019, now Pat. No. 11,125,365.

(60) Provisional application No. 62/636,317, filed on Feb. 28, 2018.

(51) Int. Cl.
*F16B 1/00* (2006.01)
*F16L 37/00* (2006.01)

(52) U.S. Cl.
CPC .... *F16L 37/004* (2013.01); *E03C 2001/0414* (2013.01); *F16B 2200/83* (2023.08)

(56) References Cited

U.S. PATENT DOCUMENTS

| | | | |
|---|---|---|---|
| 1,276,117 | A | 8/1918 | Riebe |
| 1,894,390 | A | 1/1933 | Banks |
| 2,696,264 | A | 12/1954 | Colmerauer |
| 2,878,059 | A | 3/1959 | Limle |
| 2,953,970 | A | 9/1960 | Maynard |
| 3,181,895 | A | 5/1965 | Gator |
| 3,674,014 | A | 7/1972 | Tillander |
| 4,004,298 | A | 1/1977 | Freed |
| 4,049,295 | A | 9/1977 | Piers |
| 4,054,128 | A | 10/1977 | Seufert et al. |
| 4,158,462 | A | 6/1979 | Coral |
| 4,338,937 | A | 7/1982 | Lerman |
| 4,351,323 | A | 9/1982 | Ouchi et al. |
| 4,735,357 | A | 4/1988 | Gregory et al. |
| 4,768,557 | A | 9/1988 | Holzer |
| 4,807,370 | A | 2/1989 | Trimble |
| 5,062,164 | A | 11/1991 | Lee et al. |
| 5,342,018 | A | 8/1994 | Wu |
| 5,667,146 | A | 9/1997 | Pimentel et al. |
| 5,755,262 | A | 5/1998 | Pilolla |
| 5,865,378 | A | 2/1999 | Hollinshead et al. |
| 5,868,311 | A | 2/1999 | Cretu-Petra |
| 5,979,487 | A | 11/1999 | Devehat |
| 6,164,570 | A | 12/2000 | Smeltzer |
| 6,626,210 | B2 | 9/2003 | Luettgen et al. |
| 6,648,376 | B2 | 11/2003 | Christianson |
| 6,715,491 | B2 | 4/2004 | Cooper et al. |
| 6,854,768 | B2 | 2/2005 | Elder |
| 7,019,433 | B2 | 3/2006 | Hashimoto et al. |
| 7,326,350 | B2 | 2/2008 | Mueller et al. |
| 7,383,611 | B2 | 6/2008 | Foster |
| 7,637,905 | B2 | 12/2009 | Saadat et al. |
| 7,669,899 | B2 | 3/2010 | Carson |
| 7,793,987 | B1 | 9/2010 | Busch et al. |
| 8,024,822 | B2 | 9/2011 | Magan et al. |
| 8,191,580 | B2 | 6/2012 | Scott |
| 8,210,572 | B2 | 7/2012 | Davis |
| 8,376,865 | B2 | 2/2013 | Forster et al. |
| 8,413,686 | B2 | 4/2013 | Ko |
| 8,608,502 | B2 | 12/2013 | Witter et al. |
| 9,093,206 | B2 | 7/2015 | Davis |
| 9,198,561 | B2 | 12/2015 | Smith et al. |
| 9,272,171 | B2 | 3/2016 | Kolacz et al. |
| 9,315,975 | B2 | 4/2016 | Davidson et al. |
| 9,377,156 | B2 | 6/2016 | Wong |
| 9,649,881 | B2 | 5/2017 | Warncke |
| 9,803,787 | B2 | 10/2017 | Scott et al. |
| 9,849,551 | B2 | 12/2017 | Ebihara et al. |
| 10,492,552 | B2 | 12/2019 | Jaeger et al. |
| 10,890,277 | B2 | 1/2021 | Chung |
| 11,913,574 | B2 * | 2/2024 | Chung .................. F16L 27/08 |
| 2004/0154673 | A1 | 8/2004 | Mascari et al. |
| 2005/0103903 | A1 | 5/2005 | Shamir et al. |
| 2005/0133545 | A1 | 6/2005 | Find |
| 2005/0283904 | A1 | 12/2005 | Macan et al. |
| 2006/0192161 | A1 | 8/2006 | Kuna et al. |
| 2007/0044232 | A1 | 3/2007 | McNerney et al. |
| 2008/0187393 | A1 | 8/2008 | Nellessen |
| 2009/0293238 | A1 | 12/2009 | Davis |
| 2010/0307497 | A1 | 12/2010 | Busch et al. |
| 2011/0012343 | A1 | 1/2011 | Gutierrez-Lemini et al. |
| 2011/0038064 | A1 | 2/2011 | Xhunga |
| 2011/0162743 | A1 | 7/2011 | Nelson |
| 2012/0024412 | A1 | 2/2012 | Bertelo et al. |
| 2012/0319313 | A1 | 12/2012 | Davis |
| 2013/0276923 | A1 | 10/2013 | Wolff |
| 2013/0285365 | A1 | 10/2013 | Davis |
| 2014/0166124 | A1 | 6/2014 | Davidson et al. |
| 2014/0235361 | A1 | 8/2014 | Forster et al. |
| 2014/0318650 | A1 | 10/2014 | Wolff |
| 2015/0308087 | A1 | 10/2015 | Zhu et al. |
| 2016/0109046 | A1 | 4/2016 | Lee et al. |
| 2016/0208580 | A1 | 7/2016 | Delzell et al. |
| 2016/0215482 | A1 | 7/2016 | Fourman et al. |
| 2017/0074441 | A1 | 3/2017 | Erickson et al. |
| 2019/0037322 | A1 | 1/2019 | Santek et al. |
| 2019/0264838 | A1 | 8/2019 | Chung et al. |
| 2019/0264848 | A1 | 8/2019 | Chung |
| 2019/0264849 | A1 | 8/2019 | Chung |
| 2019/0368172 | A1 | 12/2019 | Chung |
| 2019/0372322 | A1 | 12/2019 | Tseng |

FOREIGN PATENT DOCUMENTS

| | | | |
|---|---|---|---|
| EP | | 2378011 | 10/2011 |
| EP | | 2 896 759 B1 | 7/2015 |
| EP | | 3043000 | 7/2016 |
| GB | | 983278 | 2/1965 |
| GB | | 2431085 | 4/2007 |
| KR | | 20110136087 | 12/2011 |
| WO | | WO-2012/075593 | 6/2012 |
| WO | | WO-2013/093521 | 6/2013 |
| WO | | WO-2015/010251 | 1/2015 |

OTHER PUBLICATIONS

Extended European Search Report on Application No. 19159584.2 dated Jul. 15, 2019 (8 pages).
First Action on Chinese Appln. Ser. No. 201910152115.5 dated May 22, 2020 (10 pages).
Extended European Search Report re Application No. 19159570.1 issued Jul. 1, 2019.
Extended European Search Report re Application No. 19159567. 7 issued Jun. 27, 2019 (9 pgs.).
Chinese First Office Action on CN Patent Application No. 201910476937.9 dated Dec. 1, 2020 12 pages.
Chinese First Office Action with English Summary dated Jul. 15, 2020, 15 pages.
Chinese second office action on CN patent application No. 201910476155.5 dated Mar. 9, 2021.
First Action on Chinese Appln. Ser. No. 201910153128.4 dated May 22, 2020 (11 pages).
Non-Final Office Action on U.S. Appl. No. 16/284,707 dated Sep. 23, 2020.
Non-Final Office Action on U.S. Appl. No. 16/429,981 dated Oct. 29, 2020.
Non-Final Office Action U.S. Appl. No. 16/429,970 dated Mar. 17, 2021.
Notice of Allowance on U.S. Appl. No. 16/284,707 dated May 19, 2021.
Notice of Allowance on U.S. Appl. No. 16/429,970 dated May 26, 2021.
Notice of Allowance on U.S. Appl. No. 16/429,970 dated Sep. 2, 2021.
US Notice of Allowance on U.S. Appl. No. 16/429,970 dated Sep. 2, 2021.
US Office Action on U.S. Appl. No. 16/429,970 dated Mar. 17, 2021.
US Office Action on U.S. Appl. No. 16/429,981 dated Jan. 26, 2021.
Chinese third office action on CN patent application No. 201910152115.5 dated Jul. 8, 2021.

(56) References Cited

OTHER PUBLICATIONS

Final Office Action on U.S. Appl. No. 16/28470, dated Mar. 1, 2021.
Final Office Action on U.S. Appl. No. 16/429,981 dated Jun. 4, 2021.

* cited by examiner

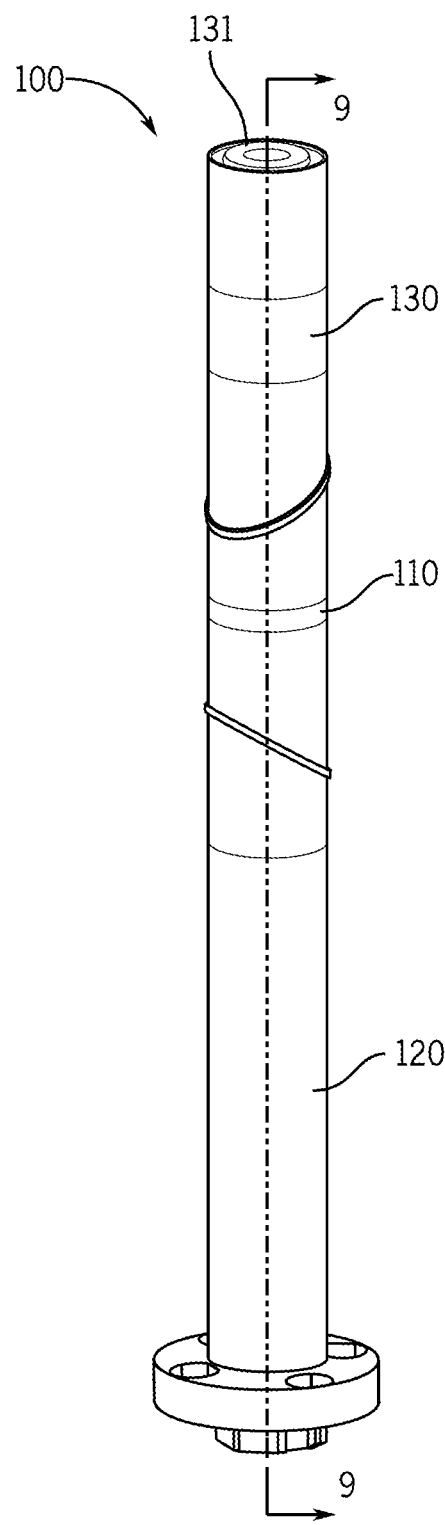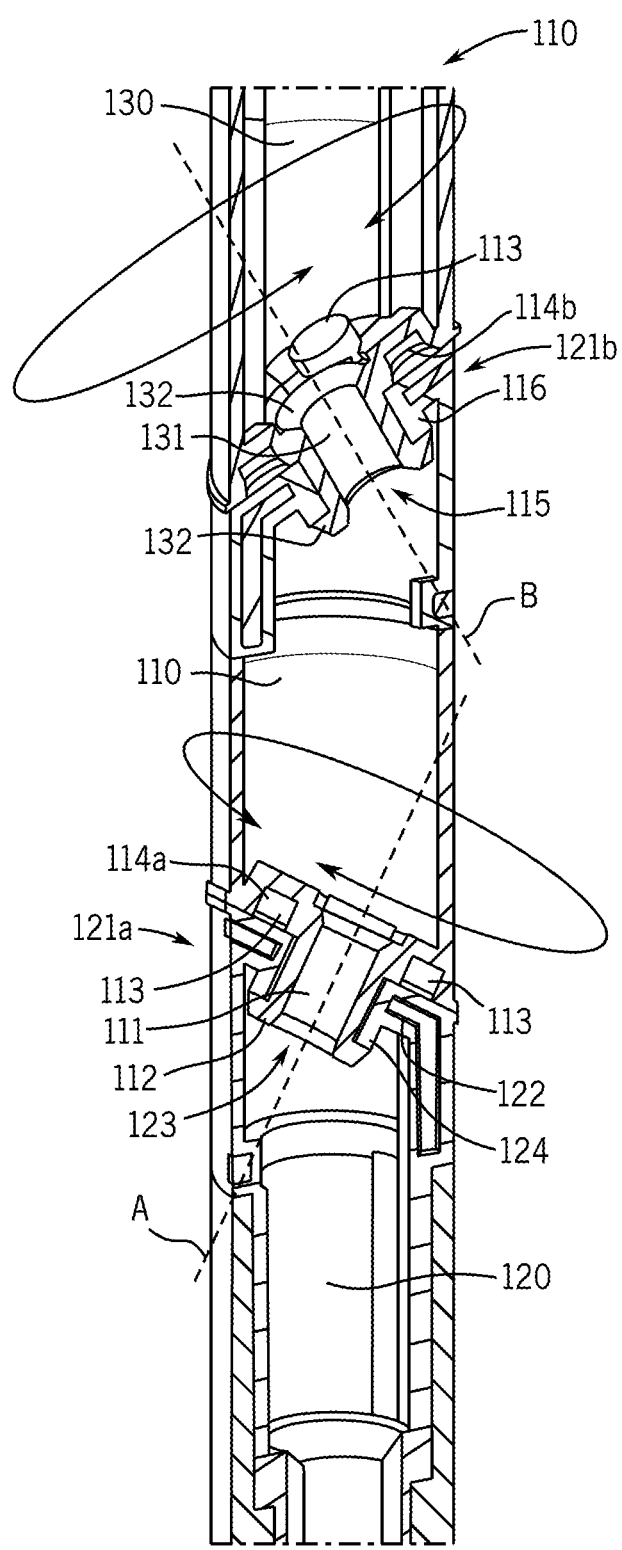
FIG. 8
FIG. 9

MAGNETIC JOINT

CROSS-REFERENCE TO RELATED PATENT APPLICATIONS

This application is a continuation of U.S. patent application Ser. No. 17/473,271, filed Sep. 13, 2021, now U.S. Pat. No. 11,913,574, which is a continuation of U.S. patent application Ser. No. 16/284,707, now U.S. Pat. No. 11,125,365, filed on Feb. 25, 2019, which claims the benefit of and priority to U.S. Provisional Application No. 62/636,314, filed Feb. 28, 2018, the entire disclosures of which are hereby incorporated by reference.

BACKGROUND

The present application relates generally to mechanical joints between movable components. More specifically, this application relates to a magnetic joint.

Assemblies and devices, such as plumbing fixtures, motors, engines, door assemblies, furniture, kitchen accessories, bathroom accessories, showerheads, or other assemblies can include movable components that can move, pivot, or rotate relative to each other to change their relative positions. Some of these movable components can include complicated mechanical joints or interfaces that are costly to engineer and difficult to assemble. In addition, some of these mechanical joints can be difficult to manually or automatically move between different rotational positions, due to, for example, the forces required to rotate the components relative to each other.

SUMMARY

One embodiment of the present application relates to a magnetic joint. The magnetic joint includes a first member and a second member. The first member includes a first plurality of magnets spaced annularly apart from each other. The second member includes a second plurality of magnets spaced annularly apart from each other. The first member is rotatably coupled to the second member. The first member is configured to be coupled to a first component and the second member is configured to be coupled to a second component. The first plurality of magnets and the second plurality of magnets are configured to cooperatively define a plurality of rotational positions between the first component and the second component.

Another embodiment relates to a magnetic joint including a first member and a second member. The first member includes a first plurality of magnets spaced annularly apart from each other on a surface of the first member. The second member includes a second plurality of magnets spaced annularly apart from each other on a surface of the second member. The first member is rotatably coupled to the second member. The first member is defined by an end of a first component and the second member is defined by an end of a second component that faces the end of the first component. The first plurality of magnets and the second plurality of magnets are configured to cooperatively define a plurality of rotational positions between the first component and the second component.

Yet another embodiment relates to a magnetic joint including a first member and a second member. The first member includes a first plurality of magnets spaced annularly apart from each other. The second member is rotatably coupled to the first member, and includes a second plurality of magnets spaced annularly apart from each other. The first plurality of magnets and the second plurality of magnets are configured to cooperatively define a plurality of rotational positions between the first member and the second member.

BRIEF DESCRIPTION OF THE DRAWINGS

FIG. 8 is a perspective view of a faucet according to an exemplary embodiment.

FIG. 9 is a cross-sectional view of the faucet of FIG. 8

DETAILED DESCRIPTION

Figure 1:
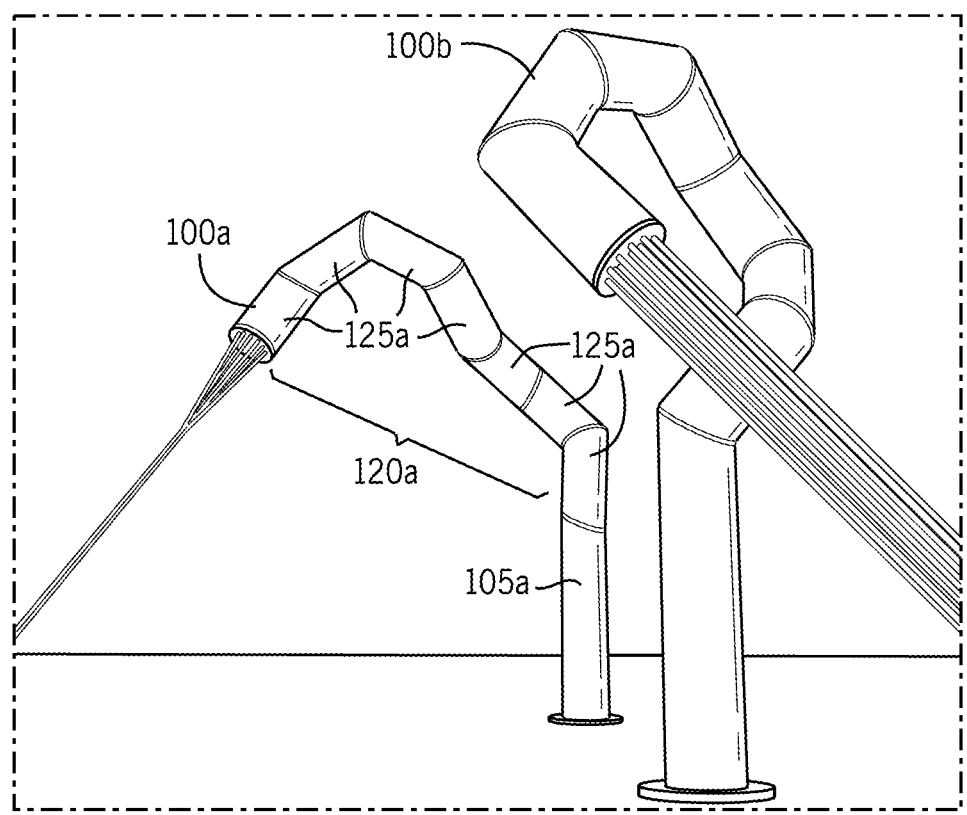
FIG. 1 is a perspective view of a faucet shown in two different orientations according to any exemplary embodiment.

Referring generally to the FIGURES, disclosed herein are magnetic joints that can be used in a variety of different devices and assemblies to permit relative rotational movement between components. The magnetic joints disclosed herein have an efficient design that is easier to assemble and requires fewer moving parts, as compared to conventional mechanical joints. In addition, the disclosed magnetic joints provide a smoother tactile response to a user, and require less force to articulate/rotate between different rotational positions, as compared to conventional mechanical joints.

For example, the disclosed magnetic joints rely on attractive/repelling forces between opposed magnets to define relative rotational positions for components that are rotatably coupled to each other. According to an exemplary embodiment, the magnetic joint includes a first member including a first plurality of individual magnets that are spaced annularly apart from each other (e.g., a first magnet array, etc.), and a second member including a second plurality of individual magnets that are similarly spaced annularly apart from each other (e.g., a second magnet array, etc.). The first member is rotatably coupled to the second member. The first member can be coupled to or integrally formed with an end of a component (e.g., a conduit section, a component of a motor or engine, a component of a hinge, a component of a handle, etc.) and the second member can be coupled to or integrally formed with an end of an adjacent component. Each of the components can be selectively rotated relative to each other between a plurality of rotational positions or detents that are defined by the spacing and the polarity of the magnets on the first and second members, so as to selectively reorient the components relative to each other.

According to another exemplary embodiment, one of the components can include a plurality of magnets arranged with alternating polarities, such that the magnets on the adjacent component are attracted to the magnets having opposite polarity on the other component (i.e., biased toward each other), to thereby set a relative rotational position of the two components. The magnets having the same polarity can repel each other (i.e., bias away from each other) during rotation of one of the components to set a different relative rotational position. According to various exemplary embodiments, the components do not physically contact each other at the magnet surfaces, so as to minimize the amount of friction at the joint. In this way, rotation of the two components relative to each other provides a smoother tactile response and requires less force to manually or automatically move the components (e.g., via an electromagnetic actuator, an electric motor, etc.), as compared to conventional mechanical joints.

The following description is directed toward the specific application of magnetic joints in the context of water delivery devices (e.g., faucets, fluid conduits, etc.). It should be appreciated, however, that the magnetic joints disclosed herein can be employed in a variety of different devices and assemblies that require relative rotational movement between components, such as, for example, motors, engines, door hinges, handles, furniture, kitchen accessories, bathroom accessories, plumbing fixtures, showerheads, etc.

Figure 2:
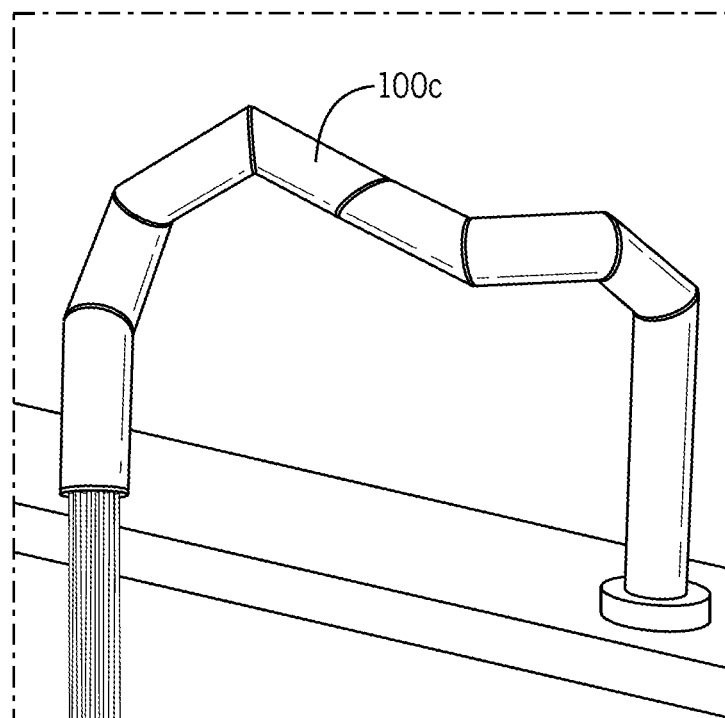
FIG. 2 is a perspective view of the faucet in FIG. 1 shown in another orientation according to another exemplary embodiment.
Figure 3:
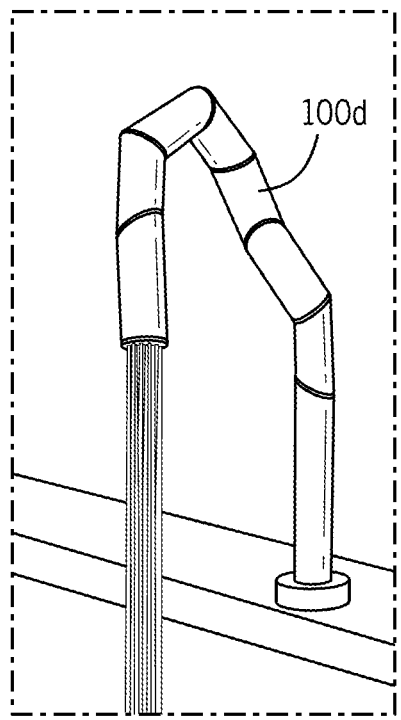
FIG. 3 is a perspective view of the faucet of FIG. 2 shown in another orientation according to another exemplary embodiment.
Figure 4:
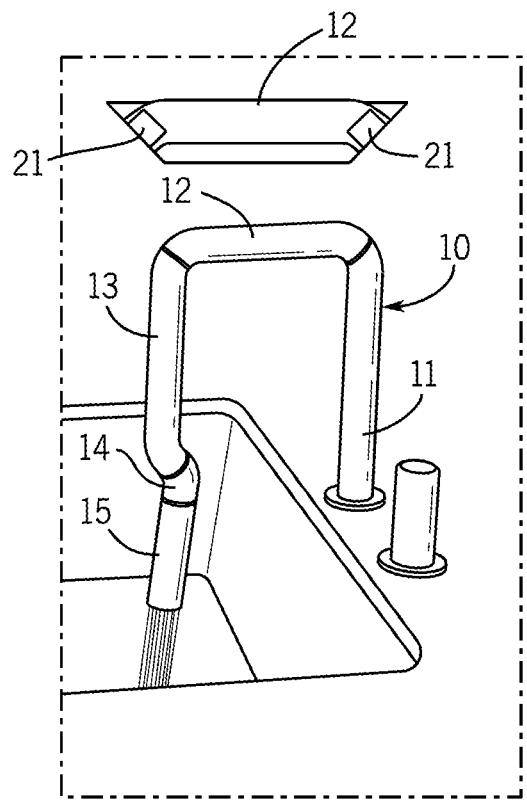
FIG. 4 illustrates a water delivery device according to another exemplary embodiment.

Referring to FIGS. 1-3, a water delivery device, shown as a faucet, includes a plurality of magnetic joints according to an exemplary embodiment. FIGS. 1-3 illustrate the same faucet in various orientations. FIG. 1 illustrates a faucet 100a shown in a first orientation and a faucet 100b shown in a second orientation that is different from the first orientation. The faucet 100a includes a base 105a and a spout 120a defined by a plurality of conduit sections 125a each rotatably coupled to each other by a magnetic joint. According to an exemplary embodiment, the plurality of conduit sections 125a are substantially rigid. Each of the plurality of conduit sections 125a can be selectively (e.g., manually or automatically) moved by rotating one or more of the conduit sections 125a relative to the base 105a, or relative to an adjacent conduit section 125a, so as to change the orientation or shape of the spout 120a. According to the exemplary embodiment shown in FIG. 1, the faucet 100a can be reconfigured or reoriented to the second orientation, shown as faucet 100b in FIG. 1. Similarly, the faucet 100a or 100b can be reconfigured to a third orientation, shown as faucet 100c in FIG. 2, or to a fourth orientation, shown as faucet 100d in FIG. 3. Although only four different faucet orientations are illustrated in FIGS. 1-3, it is appreciated that the faucet can be reconfigured or reoriented to a plurality of other orientations not shown.

As shown in FIGS. 1-3, each of the conduit sections 125a has a tapered or angled interface (e.g., joint, end, etc.) where the adjacent conduit sections meet, such that rotating the conduit sections 125a relative to each other, or relative to the base 105a, can change the orientation or overall shape of the spout 120a. For example, each conduit section 125a may define a longitudinal axis along its length. Thus, when rotating adjacent conduit sections 125a relative to each other, the angled interface between them results in changing the relative angular orientations of the longitudinal axes of adjacent conduit sections, thereby changing the relative positions of adjacent conduit sections. According to an exemplary embodiment, the conduit sections 125a have an oval cross-sectional shape, such that the angled or tapered end at the joint interface between adjacent conduit sections has a circular cross-sectional shape. This can, advantageously, allow for an annular arrangement of magnets at the joint interface to provide for uniform spacing between the individual magnets of each magnetic joint.

Referring to FIGS. 4-7, a water delivery device 10 is shown as a faucet according to another exemplary embodiment. As shown, water delivery device 10 includes a plurality of conduit sections 11, 12, 13, 14, and 15 that are rotatably coupled to each other. Conduit sections 11-15 are each substantially rigid and have an oval cross-sectional shape. The conduit section 11 defines a base of the water delivery device 10, and is configured to be coupled to a mounting surface (e.g., a countertop, a sink, etc.). The conduit section 11 can pivot or swivel about a central axis defined by the conduit section 11 relative to the mounting surface.

According to an exemplary embodiment, the conduit section 11 includes a waterway or fluid conduit disposed therein that can swivel, so as to allow for articulation of the conduit section 11. Similarly, the conduit section 15 defines a free end or outlet end of the water delivery device 10, and is also configured to swivel or pivot about a central axis defined by the conduit section 15. The plurality of conduit sections 11-15 each include a central opening for receiving one or more fluid conduits therein for communicating fluid from a fluid supply source to an end user (e.g., hot and cold water supplies, etc.).

Figure 5:
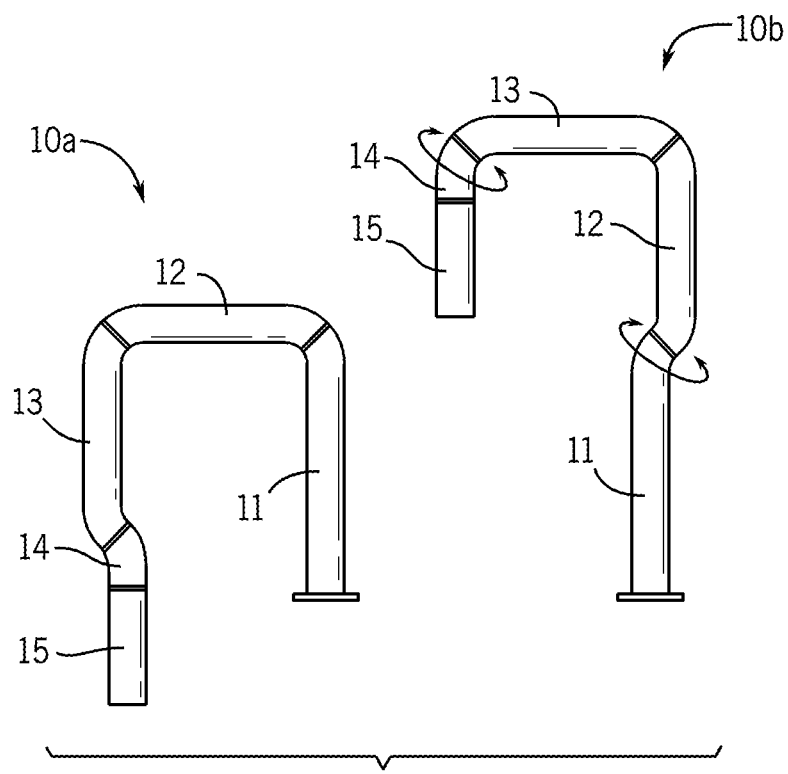
FIG. 5 illustrates the water delivery device of FIG. 4 in two different configurations.
Figure 6:
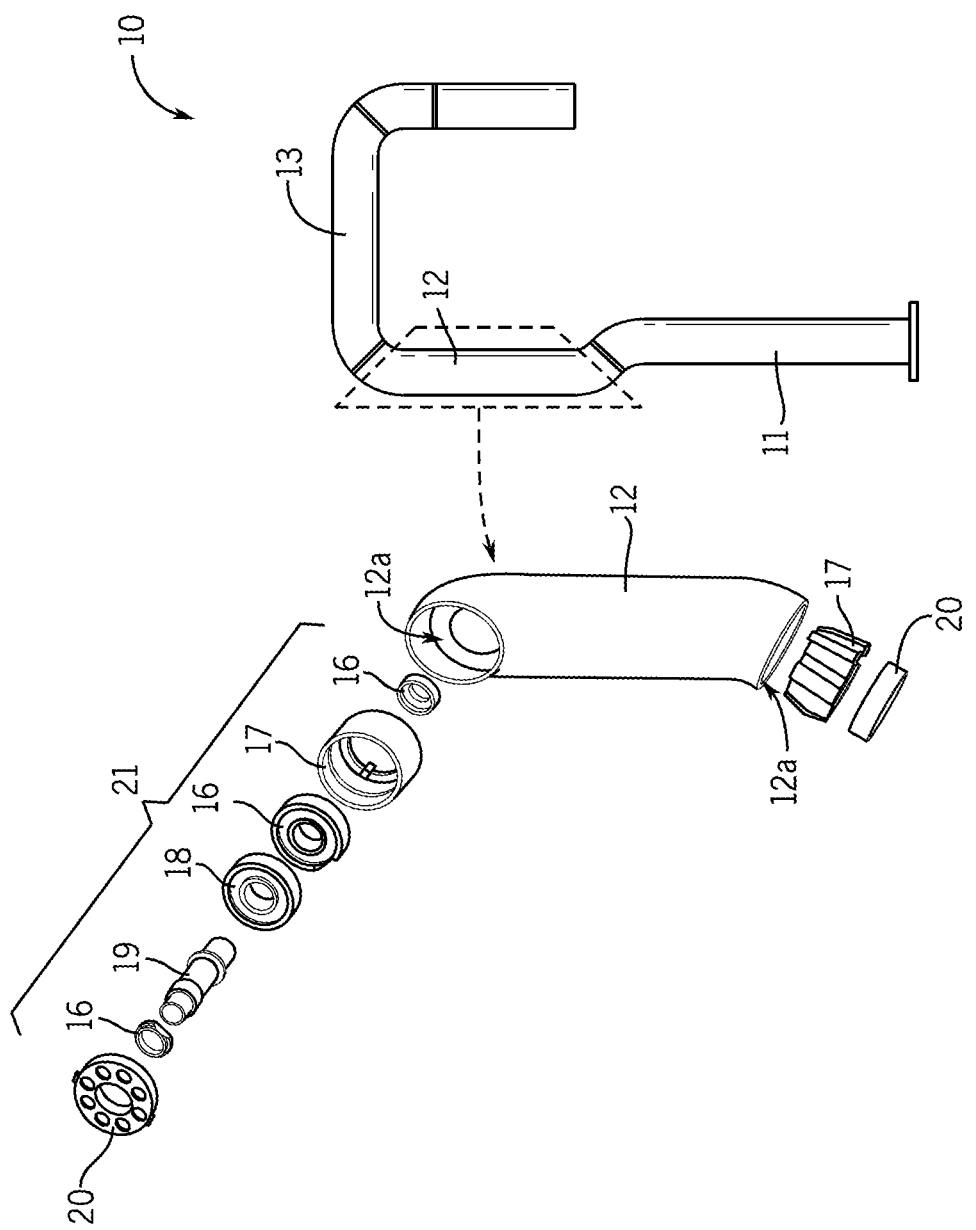
FIG. 6 is an exploded view of a conduit section of the water delivery device of FIG. 4 according to an exemplary embodiment.
Figure 7:
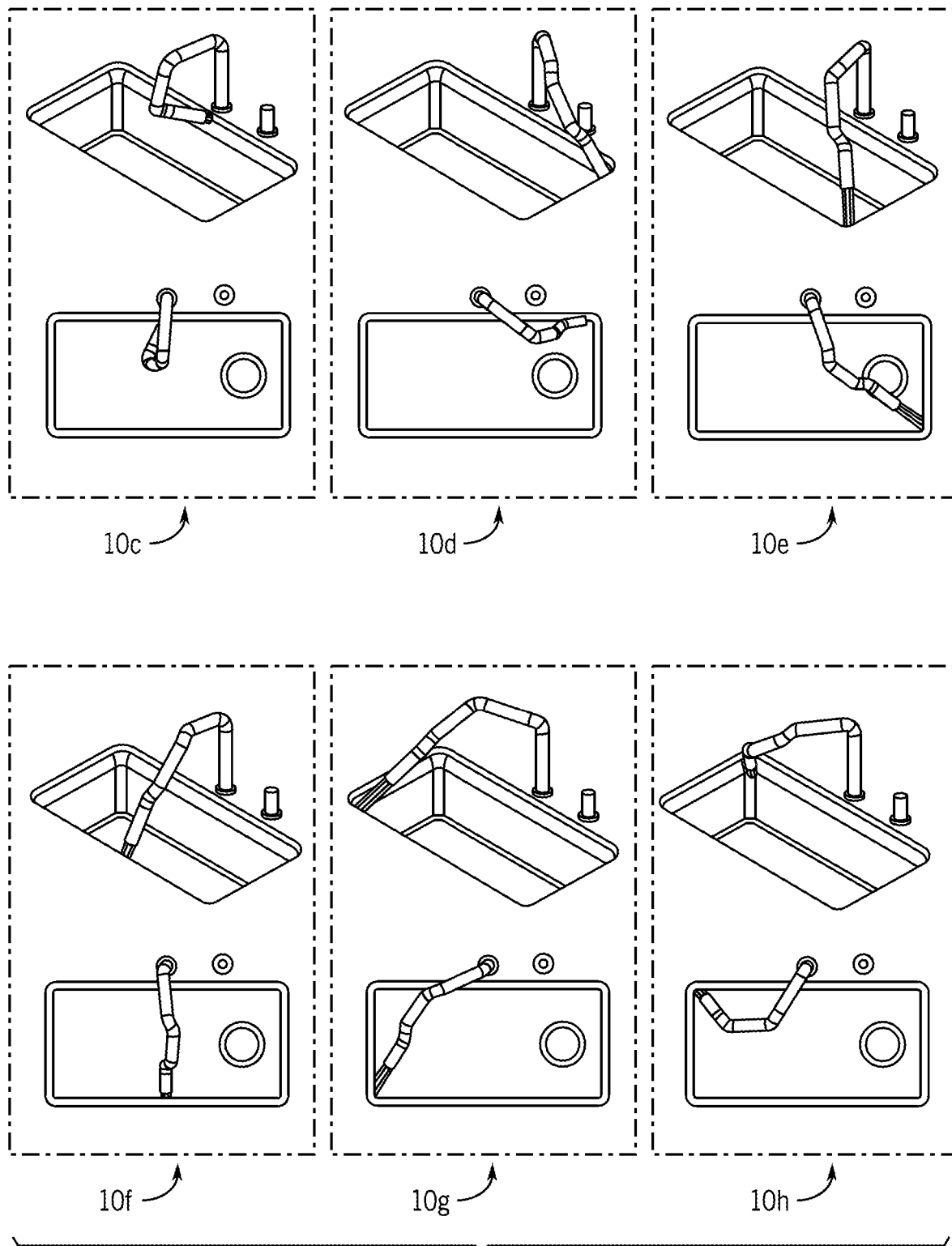
FIG. 7 illustrates the water delivery device of FIG. 4 in a plurality of different configurations relative to a sink basin.

Still referring to FIGS. 4-7, each of the conduit sections 11-14 includes an elbow portion (e.g., bent portion, angular portion, etc.) located near the ends of each conduit section that defines an angled interface between adjacent conduit sections (e.g., 45 degree interface, etc.), so as to allow for reconfiguration of the water delivery device 10. For example, each of the conduit sections 11-14 can be selectively rotated or articulated relative to an adjacent conduit section between a plurality of rotational positions that are defined by a magnetic joint disposed at the end portions of each conduit section (see, for example, magnetic joint 20 in FIG. 6). In other words, each conduit section 11-14 may define a longitudinal axis along its length, and rotating adjacent conduit sections relative to each other via the magnetic joint results in changing the relative angular orientations of the longitudinal axes of adjacent conduit sections, because of the angled interface. In this manner, the orientation and configuration of the water delivery device 10 can be selectively changed to, advantageously, allow for the water delivery device 10 to discharge water at every possible location within a sink basin, as illustrated in FIG. 7 (see, for example, water delivery device configurations 10c, 10d, 10e, 10f, 10g, 10h).

Referring to FIG. 5, the water delivery device 10 is shown in a first configuration 10a and a second configuration 10b. Although only two configurations of the water delivery device 10 are illustrated in FIG. 5, it should be appreciated that the water delivery device 10 can be adjusted or articulated between a plurality of other configurations, as illustrated in FIG. 7, for example. The water delivery device 10 is configured to be selectively adjusted between the first configuration 10a and the second configuration 10b by selectively rotating one or more of the conduit sections of the water delivery device, such as conduit sections 11, 12, 13, or 14. The conduit sections can be rotated or articulated between a plurality of angular/rotational positions that are defined by a magnetic joint at each conduit interface, as shown schematically in FIG. 5 (e.g., conduit section 12 can be rotated (illustrated by arrows) about each of the magnetic joint assemblies 21 relative to adjacent conduit sections 11 and 13, respectively). In this manner, for example, the free end of the last conduit section 15 (i.e., the outlet end of the water delivery device 10) can be moved between a first height shown in the first configuration 10a and a second height shown in the second configuration 10b, which can, advantageously, allow for the water delivery device to fill different sized containers or rinse various items within a sink basin.

Referring to FIG. 6, an exploded view of conduit section 12 is shown according to an exemplary embodiment. As shown, conduit section 12 includes a central opening for receiving a fluid conduit therein (e.g., a waterway tube, etc.) to allow for fluid communication between adjacent conduit sections. Conduit section 12 is rotatably coupled to adjacent conduit sections 11 and 13 at opposite ends of conduit section 12 by a magnetic joint assembly 21. The magnetic joint assembly 21 can be included in the ends of each of the conduit sections 11, 13, 14, and 15, so as to allow for articulation of the conduit sections relative to each other. As shown in FIG. 6, the magnetic joint assembly 21 includes a body 17 (e.g., sleeve, housing, etc.) having a generally hollow, cylindrical shape. The body 17 is configured to be received within openings 12a located at each end or each elbow portion of the conduit section 12. One or more bearings 18 are disposed within the body 17, and are configured to allow for relative rotational movement between the conduit section 12 and adjacent conduit sections 11 and 13.

A magnetic joint member 20 (e.g., a first member, etc.) is coupled to the body 17, and defines a plurality of angular or rotational positions for the conduit section 12 relative to adjacent conduit sections 11 and 13. The magnetic joint member 20 is configured to interact with, and selectively magnetically bias toward or away from, a similar magnetic joint member (e.g., a second member, etc.) disposed in adjacent conduit sections 11 and 13, so as to change the relative orientation of the conduit section 12 and adjacent conduit sections 11 and 13.

Figure 19:
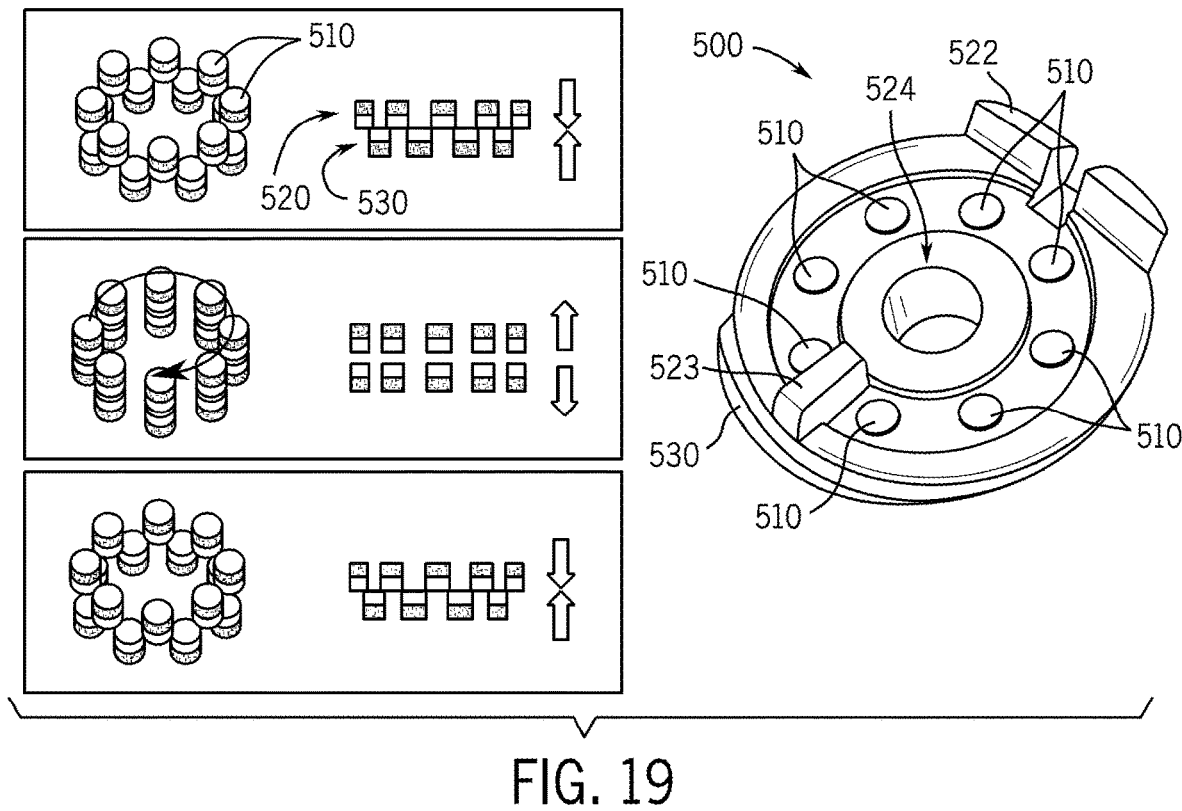
FIG. 19 illustrates the polarity and interaction of the magnetic members of a magnetic joint for use in a conduit section according to an exemplary embodiment.
Figure 20:
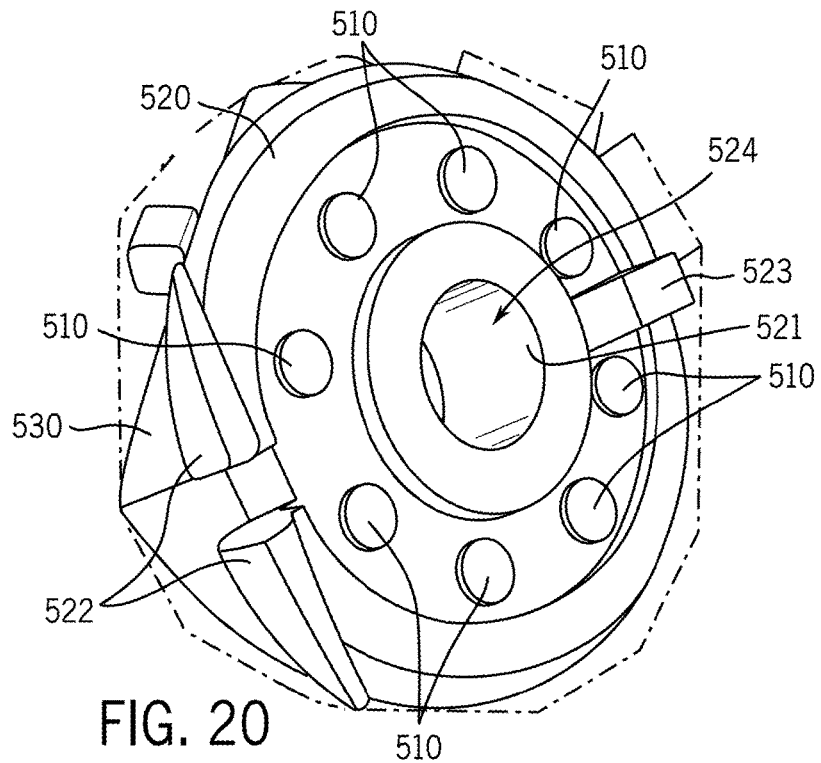
FIGS. 20-23 are perspective views of a magnetic joint according to an exemplary embodiment.
Figure 21:
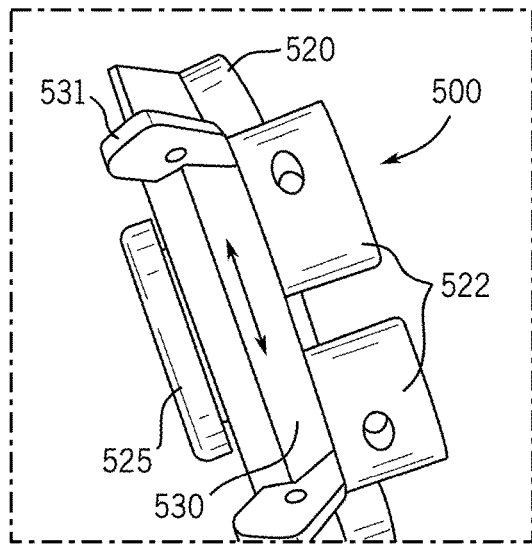
Figure 22:
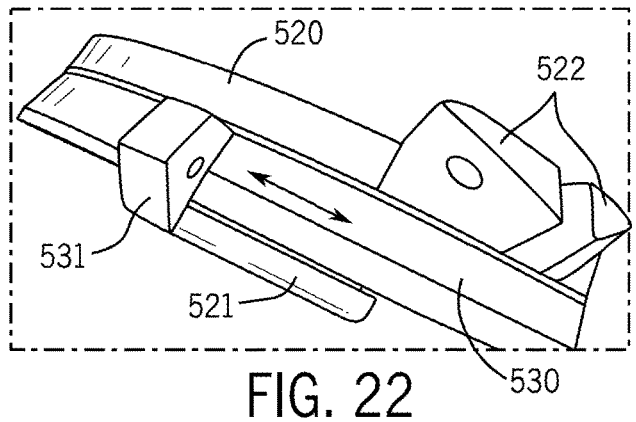
Figure 23:
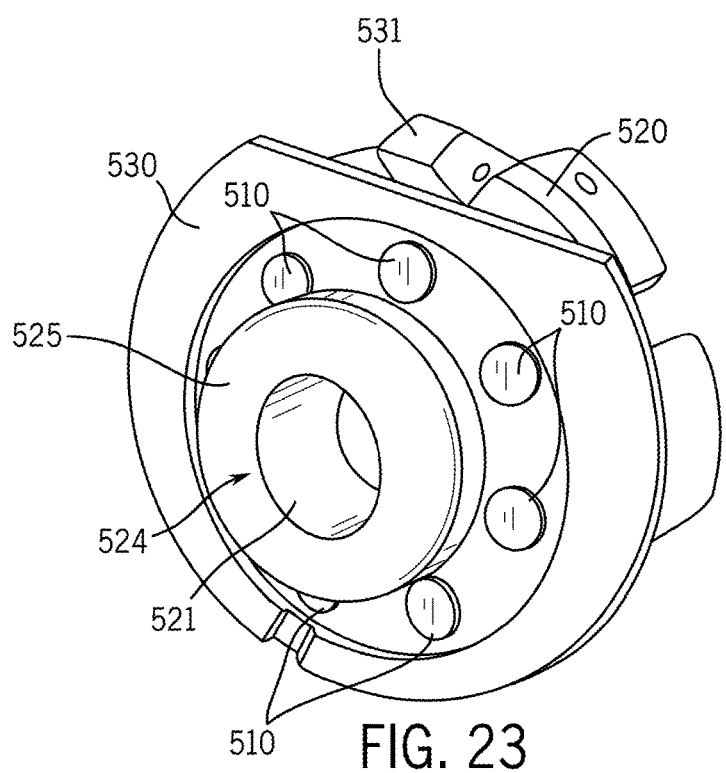

For example, referring to FIG. 19, the magnetic joint member 20 of FIG. 6 can be configured the same as a member 520, 530 of a magnetic joint 500 shown in FIG. 19, according to an exemplary embodiment. As shown in FIG. 19, the magnetic joint 500 includes a magnet array defined by a plurality of magnetic members 510 (e.g., magnets, etc.) each having a north-south polarity. The magnetic joint 500 is cooperatively defined by a first member 520 including a first plurality of magnetic members 510 that are arranged on a facing surface of the first member to have their south polarity facing toward the south polarity of a second plurality of magnetic members 510 arranged on a facing surface of a second member 530. The first member 520 and the second member 530 can be rotatably coupled to each other and can cooperatively define the magnetic joint. For example, the first member 520 can be coupled to, or integrally formed with, an end of the conduit section 12, and the second member 530 can be coupled to, or integrally formed with, an end of an adjacent conduit section 11 or 13. In this way, when the second member 530 is rotated relative to the first member 520, or vice versa, the magnetic members 510 on each member will repel each other (i.e., bias away from each other) when directly facing or substantially overlapping each other, but will attract each other (i.e., bias toward each other) when the magnetic members 510 substantially overlap the spaces between the magnetic members 510 on the opposite member due to the opposite north-south polarities in these regions. Thus, the spaces between the plurality of magnetic members 510 on each member define a plurality of rotational positions or detents to hold or rotationally bias the two members relative to each other, to thereby change the relative orientation/position of the conduit sections.

According to an exemplary embodiment, the magnet arrays of the magnetic joint 20 for each conduit section include the same number of magnetic members and can be spaced apart the same distance on each array. According to an exemplary embodiment, the magnetic joint 20 includes at least eight magnetic members. According to other exemplary embodiments, the number of, and spacing of, the magnetic members on each of the magnetic joints of the water delivery device 10 is different, depending on the relative position of each magnetic joint. According to various exemplary embodiments, the spacing and the polarity of the magnetic members can be arranged to define a plurality of rotational positions for setting a relative rotational position of the various conduit sections, the details of which are discussed in the paragraphs that follow.

Referring to FIG. 6, a waterway 19 (e.g., tube, connector, etc.) is disposed through a central portion of the magnetic joint 20, the one or more bearings 18, and the body 17, and is configured to fluidly couple the conduit section 12 to adjacent conduit sections 11 and 13. For example, the waterway 19 can, advantageously, couple a fluid conduit disposed in the conduit section 12 to a fluid conduit disposed in adjacent conduit sections 11 and 13 via couplers 16 (e.g., fasteners, etc.) at opposite ends of the waterway 19. In this way, the waterway 19 can allow for fluid communication between conduit section 12 and adjacent conduit sections 11 and 13, while permitting relative rotational movement between these conduit sections via the magnetic joints 20.

Referring to FIGS. 8-9, a faucet 100 is shown according to another exemplary embodiment. The faucet 100 includes a base 120, a first conduit section 110, and a second conduit section 130. According to an exemplary embodiment, the base 120 is configured to be coupled to a support surface, such as a countertop or the like. The first conduit section 110 and the second conduit section 130 are configured to be rotated relative to each other and relative to the base 120, so as to selectively reconfigure the shape of the faucet 100. As shown in FIG. 8, the base 120 includes a hollow interior defining a flow channel for fluid to flow through. The base 120 includes part of a first magnetic joint 121a including a first magnet array 122 having a plurality of magnetic members 113. The base 120 further includes an opening 123 defined by a wall 124. The base 120 is configured to be fixed relative to the first conduit section 110 and the second conduit section 130.

The first conduit section 110 is rotatably coupled to the base 120 at the first magnetic joint 121a via a protrusion 111. As shown in FIG. 8, the protrusion 111 is received in the opening 123, and is rotatably coupled to the wall 124 via a flange 112. The first conduit section 110 is configured to rotate relative to the base 120 via the protrusion 111 about an axis "A" defined by the opening 123. The protrusion 111 includes a hollow interior to allow for a flow of water to pass through from the base 120 to an interior of the first conduit section 110. In other words, the protrusion 111 fluidly couples the base 120 to the first conduit section 110. The first conduit section 110 further includes a second magnet array 114 having a plurality of magnetic members 113. The second magnet array 114 is positioned on a plane parallel to, and offset from, the first magnet array 122. The first magnet array 114 and the second magnet array 122 cooperatively define the first magnetic joint 121a of the assembly.

Still referring to FIG. 8, the second conduit section 130 is rotatably coupled to the first conduit section 110 at an end opposite to the first magnetic joint 121a at a second magnetic joint 121b via a protrusion 131. The protrusion 131 is received in an opening 115 defined by a wall 116 of the first conduit section 110. The protrusion 131 is rotatably coupled to the wall 116 via a flange 132. The first conduit section 110 is configured to rotate relative to the second conduit section 130, and vice versa, via the protrusion 131 about an axis "B" defined by the opening 115. The axis B is oriented at an angle that is different than the orientation of axis A (e.g., 90 degrees relative to each other, etc.), such that rotation of the first conduit section 110 and/or of the second conduit section 130 relative to each other, or relative to the base 120, results in a change of orientation of the entire assembly. The protrusion 131 includes a hollow interior to allow for a flow of water to pass through from the first conduit section 110 to an interior of the second conduit section 130, and to an outlet 131 located at a distal end of the second conduit § 130. The second magnetic joint 121b includes a third magnet array 114b having a plurality of magnetic members 113. The third magnet array 114b is positioned on a plane parallel to, and offset from, a fourth magnet array 132 located at an end of the second conduit section 130. The third magnet array 114b and the fourth magnet array 132 cooperatively define the second magnetic joint 121b of the assembly.

According to an exemplary embodiment, the various magnet arrays of the first and second magnetic joints 121a, 121b have the same number of magnetic members and can be spaced apart the same distance on each array. According to an exemplary embodiment, the first magnetic joint 121a and the second magnetic joint 121b can include at least eight magnetic members. According to other exemplary embodiments, the number of, and spacing of, the magnetic members on each of the magnetic joints is different. According to various exemplary embodiments, the spacing and the polarity of the magnetic members can be arranged to define a plurality of rotational positions for setting a relative rotational position of the various conduit sections (e.g., conduit sections 110, 130, etc.).

Figure 11:
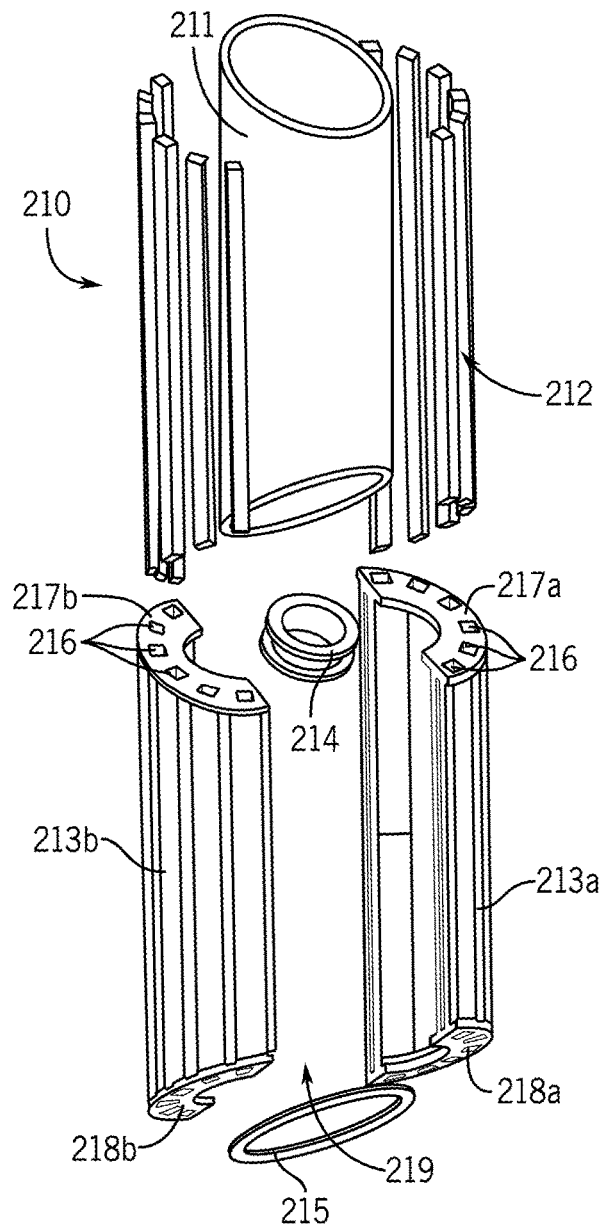
FIG. 11 is an exploded view of the conduit section of FIG. 10.

For example, referring to FIG. 19, the magnetic members 113 of the various magnet arrays described above can be configured or arranged the same as the magnetic members 510 shown in FIG. 11. As shown in FIG. 19, the magnetic members 510 each have a north-south polarity. A first member 520 includes a first plurality of magnetic members 510 that are arranged to have their south polarity facing toward the south polarity of a second plurality of magnetic members 510 located on a second member 530. The first member 520 and the second member 530 can cooperatively define a magnetic joint. In this way, when the second member 530 is rotated relative to the first member 520, the magnetic members 510 will repel each other (i.e., bias away from each other) when substantially overlapping (e.g., directly facing, etc.) each other on the two members, but will attract each other (i.e., bias toward each other) when the magnetic members 510 substantially overlap the spaces between the magnetic members due to the opposite north-south polarities in these regions. Thus, the spaces between the plurality of magnetic members 510 on each member define a plurality of angular positions to hold or rotationally bias the two members relative to each other.

In this manner, the magnetic joints 121a, 121b can allow for the selective repositioning of the first conduit section 110 and/or the second conduit section 130 relative to each other or relative to the base 120, so as to reconfigure the shape of the faucet 100. This can, advantageously, allow for the faucet 100 to fill various containers, provide access for cleaning various kitchen accessories (e.g., pots, pans, etc.), provide clearance around other structures or appliances where the faucet is installed, or change the overall aesthetic appearance of the faucet.

Figure 10:
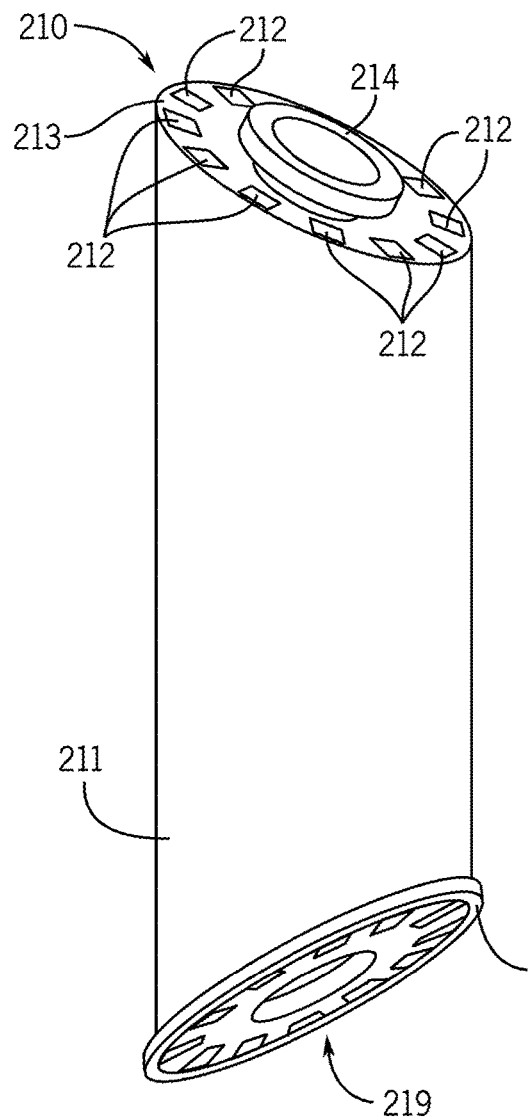
FIG. 10 is a perspective view of a conduit section for use in a fluid delivery device according to an exemplary embodiment.

Referring to FIGS. 10-11, a conduit section 210 is shown according to another exemplary embodiment. In this exemplary embodiment, the conduit section 210 includes an outer sleeve 211, a first body half 213a, a second body half 213b, a plurality of magnetic members 212, a bushing 214, and a seal 215. The first body half 213a and the second body half 213b each include a plurality of openings or sleeves 216 for receiving a plurality of magnetic members 212 therein. As shown in the embodiment of FIG. 11, the first and second body halves 213a and 213b each include six sleeves 216 arranged circumferentially about a center axis of each body half According to other exemplary embodiments, the body halves 213a, 213b can include a different number of sleeves for receiving a different number of magnetic members 212. Each of the sleeves 216 is spaced equidistant relative to each other along the circumference of each body, according to an exemplary embodiment, although other alternative spacing is contemplated. The first body half 213a and the second body half 213b each have a generally half-cylinder shape. The first body half 213a is configured to be coupled to the second body half 213b (e.g., via adhesive, ultrasonic welding, etc.) to define a single, unitary body 213 including a central opening 219 (see FIG. 10). The two body halves 213a, 213b are configured to be coupled to each other with the bushing 214 disposed therebetween at an upper and/or lower portion thereof. At least a portion of the bushing 214 is disposed above an end of the body 213, and is configured to rotatably couple two conduit sections together (see, for example, FIGS. 12-14). In addition, the bushing 214 includes a central opening to fluidly couple two conduit sections together (i.e., to allow a flow of fluid to pass between two adjacent conduit sections).

Still referring to FIGS. 10-11, the first body half 213a includes an upper end surface 217a and a lower end surface 218a. The upper end surface 217a and the lower end surface 218a are each oriented at different angles relative to each other (e.g., 90 degrees, etc.). In other words, the upper end surface 217a and the lower end surface 218a are not parallel to each other. Likewise, the second body half 213b includes an upper end surface 217b and a lower end surface 218b. The upper end surface 217b is oriented at the same angle as the upper end surface 217a of the first body half 213a, and the lower end surface 217b is oriented at the same angle as the lower end surface 217a, to thereby define upper and lower coplanar surfaces of the unitary body 213 (e.g., when the first and second body halves 213a, 213b are coupled together). In this way, rotation of the conduit section 210 relative to another adjacent conduit section 210, or relative to a fixed base (e.g., base 120, etc.), will change the orientation or overall shape of the assembly. According to an exemplary embodiment, the conduit section 210 has an oval cross-sectional shape, such that the angled end surfaces have a circular cross-sectional shape. This can, advantageously, allow for an annular array of magnetic members 212 at the end surfaces to provide for uniform spacing between the individual magnetic members.

As shown in the embodiment of FIGS. 10-11, each of the magnetic members 212 is disposed in a sleeve 216 of the body 213. At least a portion of each of the magnetic members 212 is exposed at the upper end surface 217 and at the lower end surface 218. According to an exemplary embodiment, each of the magnetic members 212 is substantially flush with the upper end surface 217 and the lower end surface 218 of the body 213. In this way, the upper end surface 217 and the lower end surface 218 can define part of an upper magnetic joint and a lower magnetic joint of the conduit 210, respectively. The upper magnetic joint and the lower magnetic joint can, advantageously, allow for a plurality of conduit sections 210 to be rotatably coupled together.

Figure 12:
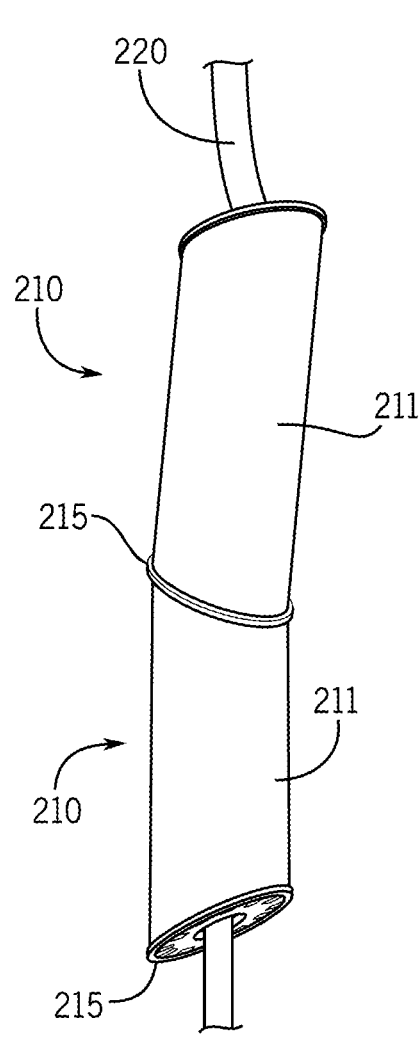
FIG. 12 is a perspective view of two conduit sections including a central conduit, according to an exemplary embodiment.
Figure 13:
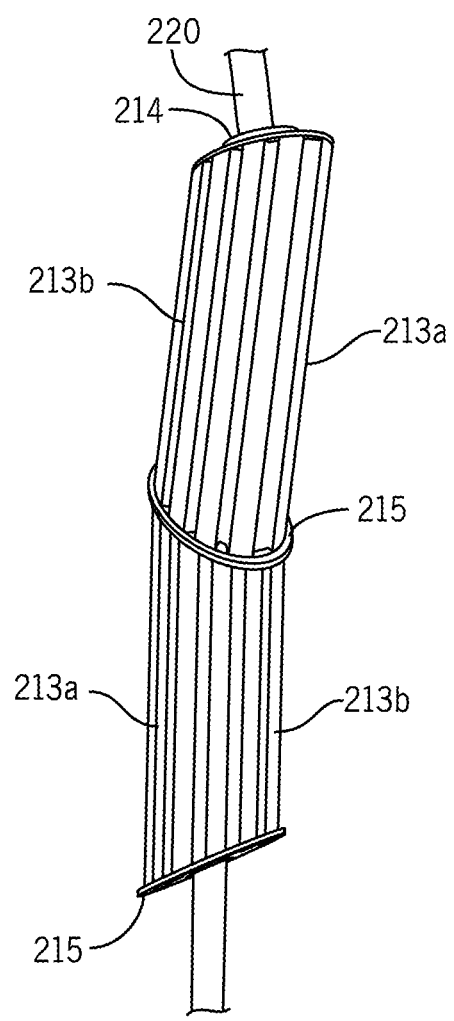
FIG. 13 is a perspective view of the two conduit sections of FIG. 12 shown with the outer cover removed.
Figure 14:
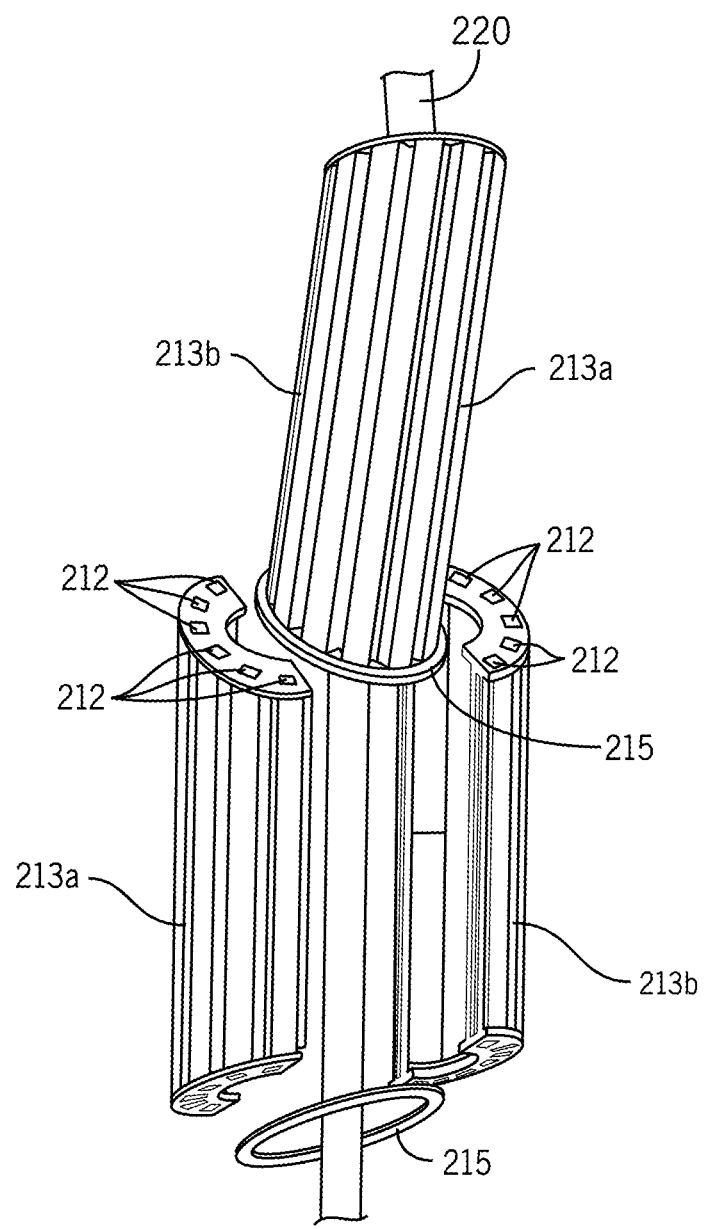
FIG. 14 is a partial exploded view of the two conduit sections of FIG. 13.

For example, as shown in FIGS. 12-14, at least two conduit sections 210 are rotatably coupled to each other to define, for example, part of a faucet assembly or a similar water delivery device. A fluid conduit 220 (e.g., tube, etc.) is disposed through the central opening 219 of each conduit section 210 to allow for a flow of fluid to pass therethrough. The seal 215, shown as an O-ring according to an exemplary embodiment, can sealingly engage two conduit sections 210 at an interface of the two conduit sections 210. As shown in FIGS. 12-14, the two conduit sections 210 are rotatably coupled to each other via the bushing 214, and can be selectively rotated between a plurality of angular positions defined by a magnetic joint of the assembly. The magnetic joint is cooperatively defined by a lower end surface 217 of the upper conduit section 210 and an upper end surface of the lower conduit section 210. According to various exemplary embodiments, the spacing and the polarity of the magnetic members 212 at the upper and lower end surfaces of the adjacent conduit sections can be arranged to define the plurality of angular positions for setting or holding the two conduit sections 210 relative to each other.

For example, according to an exemplary embodiment, the magnetic members 212 on one of the conduit sections 210 can be arranged to have an opposite polarity to the magnetic members on the adjacent conduit section 210, such that the two conduit sections can be magnetically coupled or biased toward each other by an attractive magnetic force when the magnetic members on the two conduit sections are facing each other at the magnetic joint interface. According to another exemplary embodiment, the magnetic members 212 can be arranged to have the same polarity when facing each other, such that the magnetic members 212 repel each other or bias away from each other when rotated directly above or substantially overlapping an opposite magnet on the adjacent conduit section, but can attract each other or bias toward each other when the magnetic members 512 substantially overlap the spaces between the magnetic members 212 on the end surfaces (e.g., due to the opposite polarity in those regions of the magnetic joint interface). According to various exemplary embodiments, the conduit sections 210 do not physically contact each other at the magnetic interface of the two conduit sections, so as to minimize the amount of friction at the joint interface. In this way, rotation of the two conduit sections relative to each other provides a smoother tactile response and requires less effort by a user and/or by an actuator (e.g., an electromagnetic actuator, etc.), as compared to conventional mechanical joints.

Figure 15:
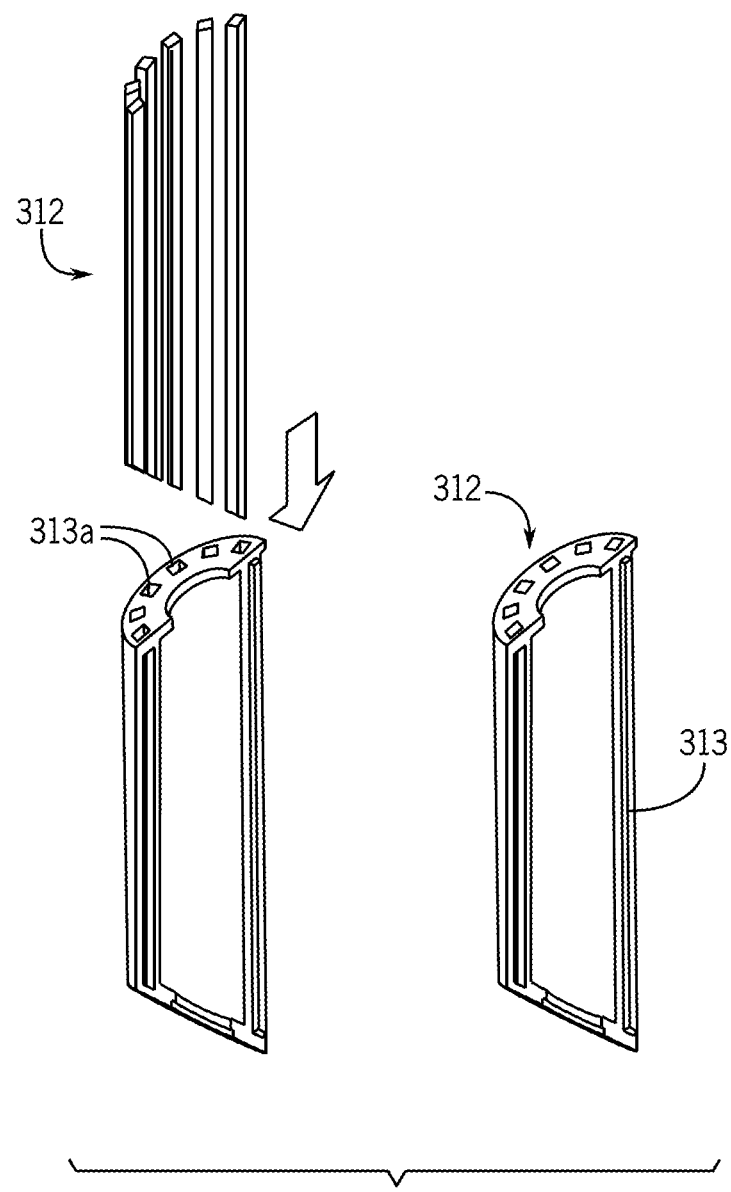
FIG. 15 illustrates a method of inserting magnetic members into a conduit section according to an exemplary embodiment.

Referring to FIG. 15, a body half 313 for a conduit section is shown including a plurality of sleeves 313a for receiving a plurality of magnetic members 312, according to another exemplary embodiment. The body half 313 and the magnetic members 312 are identical to the body half 213b and the magnetic members 212 of FIGS. 10-14. The plurality of magnetic members 312 can each be arranged to have their north polarity facing upward and their south polarity facing downward prior to being inserted into each of the sleeves 313a of the body half 313. Each of the magnetic members 312 can have their end surfaces compound angle cut to match the angles of the corresponding end surfaces of the body half 313, such that the ends of the magnetic members 312 are substantially flush with the end surfaces of the body half 313. This can, advantageously, allow for more consistent rotation and magnetic holding of the conduit section relative to other conduit sections. According to another exemplary embodiment, the pre-cut magnetic members 312 can be insert molded with the body half 313.

Figure 16:
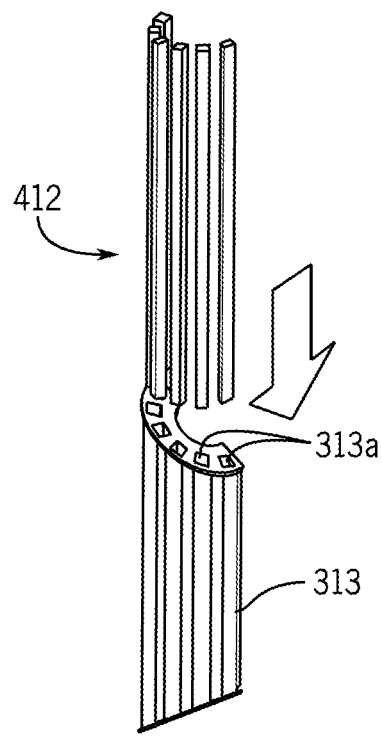
FIGS. 16-18 illustrate a method of assembling magnetic members into a conduit section according to another exemplary embodiment.
Figure 17:
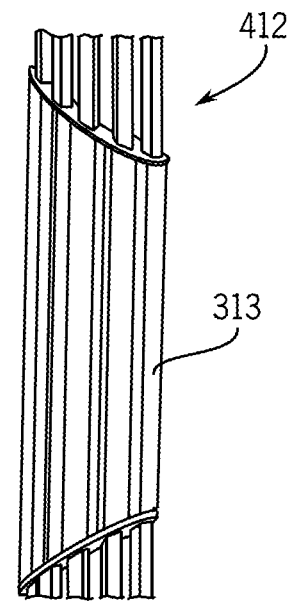
Figure 18:
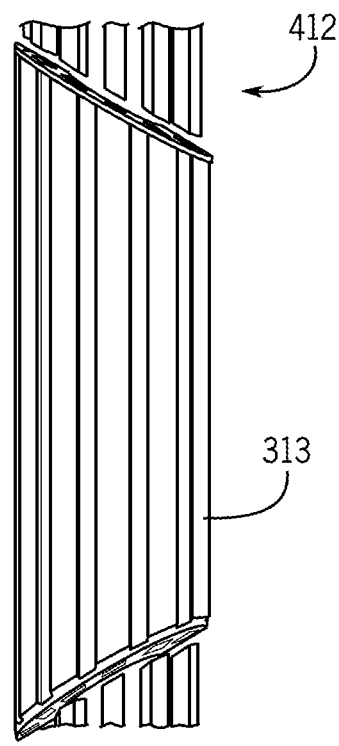

According to another exemplary embodiment shown in FIGS. 16-18, a plurality of uncut magnetic members 412 are first inserted into each of the sleeves 313a of the body half 313. The plurality of magnetic members 412 can then have their end surfaces compound angle cut to match the angles of the corresponding end surfaces of the body half 313 after the magnetic members are inserted in the body half 313, such that the ends of the magnetic members 412 are substantially flush with the end surfaces of the body half 313. According to other exemplary embodiments, the uncut magnetic members 412 can be insert molded with the body half 313, and then cut after molding and curing of the body half 313.

Referring to FIGS. 19-23, a magnetic joint 500 is shown according to an exemplary embodiment. The magnetic joint 500 can be used as a joint interface for rotatably coupling a plurality of components together, such as adjacent conduit sections of a water delivery device (e.g., first conduit section 110 and third conduit section 130, etc.). According to other exemplary embodiments, the magnetic joint 500 can be used to rotatably couple other components used on, for example, plumbing fixtures, motors, engines, bathroom accessories, kitchen accessories, showerheads, door assemblies, or other types of devices and assemblies where it is desirable to rotatably couple one or more components together to allow for the selective repositioning of the components relative to each other.

As shown in the embodiment of FIGS. 19-23, the magnetic joint 500 includes a first member 520 and a second member 530. According to an exemplary embodiment, the first member 520 can be coupled to, or integrally formed with, an end of a component (e.g., conduit section 12, 110, 130, etc.). Similarly, the second member 530 can be coupled to, or integrally formed with, an end of a second, adjacent component. For example, the first member 520 includes a plurality of tabs 522, 523 for coupling (e.g., inserting, etc.) the first member 520 to another member, such as a portion of a first conduit section (e.g., conduit section 12, 110, 130, etc.). Similarly, the second member 530 includes one or more tabs 531 for coupling the second member 530 to another adjacent member, such as a portion of a second conduit section. The first member 520 includes a central passage 524 defined by a protrusion 521 extending from the first member 520. The central passage 524 can, for example, permit a flow of fluid to pass between two adjacent conduit sections. The protrusion 521 has a substantially cylindrical shape, and is configured to rotatably couple the first member 520 to the second member 530. The protrusion 521 includes a flange portion 525 for retaining the second member 530 to the first member 520 in an axial direction. According to an exemplary embodiment, the first member 520 and the second member 530 only physically contact each other at the protrusion 521, but are otherwise spaced apart (e.g., offset, etc.) from each other (see, for example, FIG. 22).

Still referring to FIGS. 19-23, the first member 520 and the second member 530 are each configured to be selectively rotated relative to each other between a plurality of angular or rotational positions that are defined by a plurality of magnetic members 510. The magnetic members 510 have a circular arrangement on each of the first member 520 and the second member 530. According to the exemplary embodiment shown, the magnetic members 510 are spaced equidistant to each other, and eight magnetic members are disposed on each of the first and second members 520, 530. According to other exemplary embodiments, there are a different number of magnetic members 510 on the first member 520 and/or the second member 530. According to various exemplary embodiments, the spacing and the polarity of the magnetic members 510 on the first and second members 520, 530 can be arranged to define a plurality of angular positions for setting or holding the two members relative to each other.

For example, according to an exemplary embodiment, the magnetic members 510 on the first member 520 can be arranged to have an opposite polarity facing the magnetic members on the second member 530, such that the two members can be magnetically coupled or biased toward each other by an attractive magnetic force when the magnetic members on the two members are facing each other. According to another exemplary embodiment shown in FIG. 19, the magnetic members 510 can be arranged to have the same polarity when facing each other, such that the magnetic members 510 repel each other or bias away from each other when rotated directly above or substantially overlapping an opposite magnet on the other member, but can attract each other or bias toward each other when rotated to the spaces between the magnetic members on the two members (e.g., due to the opposite polarity in those regions of the magnetic joint). According to an exemplary embodiment, the first member 520 only physically contacts the second member 530 at the protrusion 531. In other words, the two members do not physically contact each other at the magnetic members 510, so as to minimize the amount of friction at the joint interface. In this way, rotation of the two members relative to each other provides a smoother tactile response and requires less effort to rotate by a user and/or by an actuator (e.g., an electromagnetic actuator, etc.), as compared to conventional mechanical joints.

The magnetic joints disclosed herein can, advantageously, rotatably couple a plurality of components together, and can allow for relative rotation between components to set a desired rotational position. The disclosed magnetic joints have an efficient design that can be applied to a variety of different devices and assemblies where relative rotation between components is desired.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the apparatus and control system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

What is claimed:
1. A conduit section comprising:
   a body having a first end and a second end;
   a protrusion extending from the first end, the protrusion comprising a hollow interior and a flange extending from the protrusion, the flange configured to rotatably couple to a wall of an adjoining conduit section so as to allow rotation between the conduit sections;
an opening disposed on the second end;
a plurality of first magnets disposed on the first end around the protrusion; and
a plurality of second magnets disposed on the second end around the opening.

2. The conduit section of claim 1, wherein:
the first end is disposed along a first plane; and
the second end is disposed along a second plane that is not parallel to the first plane.

3. The conduit section of claim 1, wherein:
the body is centered on a first axis; and
the hollow interior is centered on a second axis that is not parallel to the first axis.

4. The conduit section of claim 3, wherein the opening is centered on a third axis that is not parallel to the first axis or the second axis.

5. The conduit section of claim 3, wherein the first axis extends through a portion of the hollow interior and a portion of the opening.

6. The conduit section of claim 1, wherein each of the first magnets is arranged so as to attract a first joint magnet with a first polarity towards the first end.

7. The conduit section of claim 6, wherein each of the second magnets is arranged so as to attract a second joint magnet with the first polarity towards the second end.

8. The conduit section of claim 6, wherein each of the second magnets is arranged so as to attract a second joint magnet with a second polarity towards the second end, the second polarity being opposite to the first polarity.

9. The conduit section of claim 1, further comprising a fluid conduit extending through the hollow interior and the opening, the fluid conduit configured to facilitate flow of fluid through the first end, the body, and the second end.

10. The conduit section of claim 1, wherein:
the protrusion is configured to be received within the opening; and
the opening is configured to receive the protrusion.

11. A conduit section comprising:
a body having a first end surface and a second end surface oriented at different angles relative to each other;
a seal disposed on at least one of the first and second end surfaces;
a first annular array of magnets disposed at the first end surface within the body; and
a second annular array of magnets disposed at the second end surface within the body,
wherein the first and second annular arrays of magnets are connected by an elongate body extending along the body.

12. The conduit section of claim 11, further comprising:
a protrusion extending from the first end surface, the protrusion having structure defining a hollow interior; and
an opening defined in second end surface,
wherein the first annular array of magnets is disposed on the first end surface around the protrusion and inward from an outer surface of the body; and
the second annular array of magnets is disposed on the second end surface around the opening and inward from an outer surface of the body.

13. The conduit section of claim 12, further comprising:
a fluid conduit extending through the hollow interior and the opening, the fluid conduit configured to facilitate flow of fluid through the first end, the body, and the second end.

14. The conduit section of claim 12, wherein the body is centered on a first axis, the hollow interior is centered on a second axis that is not parallel to the first axis, and the opening is centered on a third axis that is not parallel to the first axis or the second axis.

15. A faucet comprising:
a base,
a spout coupled to the base, the spout comprising a plurality of conduit sections, wherein adjacent conduit sections are rotatably coupled to each other, each conduit section including—
a body having a first end and a second end;
a protrusion extending from the first end, the protrusion having structure defining a hollow interior;
an opening disposed on the second end;
a plurality of first magnets disposed on the first end around the protrusion,
wherein the base and the plurality of conduit sections are in fluid communication with one another to facilitate fluid flow between the base and the spout and to facilitate fluid delivery from an end of the spout opposite the base.

16. The faucet of claim 15, wherein each of the conduit sections further comprises:
an opening disposed on the second end; and
a plurality of second magnets disposed on the second end around the opening.

17. The faucet of claim 16, wherein each of the first magnets is arranged so as to attract a first joint magnet with a first polarity towards the first end, and wherein each of the second magnets is arranged so as to attract a second joint magnet towards the second end, wherein the second joint magnet has either the first polarity or a second polarity opposite the first polarity.

18. The faucet of claim 15, wherein the faucet is configured to shift between a first orientation and a second orientation by rotation of one or more of the conduit sections relative to the base or relative to an adjacent conduit section.

* * * * *